US012664069B2

(12) United States Patent
Silverstein et al.

(10) Patent No.: US 12,664,069 B2
(45) Date of Patent: Jun. 23, 2026

(54) CODE CONCIERGE MODEL (CCM) FOR PREDICTING RUNTIME ERRORS OF SOURCE CODE

(71) Applicant: INTERNATIONAL BUSINESS MACHINES CORPORATION, Armonk, NY (US)

(72) Inventors: Zachary A. Silverstein, Georgetown, TX (US); Hernan A. Cunico, Holly Springs, NC (US); Jonathan D. Dunne, Dungarvan (IE); Saswati Dana, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 18/315,519

(22) Filed: May 11, 2023

(65) Prior Publication Data

US 2024/0378135 A1      Nov. 14, 2024

(51) Int. Cl.
*G06F 11/3604* (2025.01)

(52) U.S. Cl.
CPC ................................. *G06F 11/3608* (2013.01)

(58) Field of Classification Search
CPC ................................................... G06F 11/3608
See application file for complete search history.

(56) References Cited

U.S. PATENT DOCUMENTS

| | | | |
|---|---|---|---|
| 8,538,897 B2 | 9/2013 | Han et al. | |
| 9,201,646 B2 | 12/2015 | Balachandran | |
| 9,213,624 B2 | 12/2015 | Nair et al. | |
| 9,971,581 B1 * | 5/2018 | Nandanuru | ............... G06F 8/51 |
| 10,372,592 B2 | 8/2019 | Champlin-Scharff et al. | |
| 10,423,522 B2 | 9/2019 | Bergen | |
| 10,459,695 B2 | 10/2019 | Hauser | |

(Continued)

OTHER PUBLICATIONS

Francois Role et al., "CoClust: A Python Package for Co-Clustering", 2019 [retrieved Sep. 27, 2025], Journal of Statistical Software, vol. 88, Issue 7, pp. 1-29, downloaded from <url>:https://www.jstatsoft.org/article/view/v088i07. (Year: 2019).*

(Continued)

*Primary Examiner* — S. Sough
*Assistant Examiner* — Stephen D Berman
(74) *Attorney, Agent, or Firm* — Seed Intellectual Property Law Group LLP

(57) ABSTRACT

Aspects of the present disclosure relate generally to software development environments and, more particularly, to predicting runtime errors in software development environments. For example, a computer-implemented method includes: clustering similar regions of source code into clusters of code regions; identifying source code exceptions from at least one past execution of an executable image of the source code; deriving a model of features of the source code associated with the source code exceptions for the clusters of code regions; generating a matrix as output of the model that predicts a likelihood of an occurrence of at least one uncaught exception during a future execution of the executable image of the source code in a cluster of the clusters of code regions; and annotating the source code in the code region of the cluster with an indication of the likelihood of the occurrence of the at least one uncaught exception.

17 Claims, 8 Drawing Sheets

(56) References Cited

U.S. PATENT DOCUMENTS

| | | | | |
|---|---|---|---|---|
| 10,503,631 | B1 | 12/2019 | Talluri et al. | |
| 10,545,811 | B2 | 1/2020 | Gaha Tchamabe et al. | |
| 10,579,509 | B2 | 3/2020 | Banuelos et al. | |
| 11,392,356 | B1 * | 7/2022 | Leopoldseder | G06F 8/443 |
| 11,748,239 | B1 * | 9/2023 | Gouda | G06N 20/00 |
| | | | | 706/11 |
| 2014/0033176 | A1 * | 1/2014 | Rama | G06F 11/3688 |
| | | | | 717/124 |
| 2015/0081614 | A1 * | 3/2015 | Bechet | G06F 11/30 |
| | | | | 706/52 |
| 2017/0293542 | A1 * | 10/2017 | Xu | G06N 3/0442 |
| 2018/0150742 | A1 * | 5/2018 | Woulfe | G06F 11/3608 |
| 2018/0267886 | A1 * | 9/2018 | Durga | G06F 11/3668 |
| 2019/0065343 | A1 * | 2/2019 | Li | G06F 11/008 |
| 2019/0303564 | A1 | 10/2019 | Kelly | |
| 2020/0026641 | A1 | 1/2020 | Rajagopalan et al. | |
| 2021/0157577 | A1 * | 5/2021 | Sobran | G06F 11/302 |
| 2021/0182031 | A1 * | 6/2021 | Ye | G06F 8/34 |
| 2022/0374333 | A1 * | 11/2022 | Kanta | G06F 11/3608 |
| 2024/0086311 | A1 * | 3/2024 | Meenal Kathiresan | |
| | | | | G06F 40/30 |
| 2024/0303075 | A1 * | 9/2024 | Chatterjee | G06F 8/77 |

OTHER PUBLICATIONS

Inderjit S. Dhillon et al., "Information-theoretic co-clustering," 2003 [retrieved Sep. 27, 2025], KDD '03: Proceedings of the ninth ACM SIGKDD international conference on Knowledge discovery and data mining, pp. 89-98, downloaded from <url>:https://dl.acm. org/doi/abs/10.1145/956750.956764. (Year: 2003).*

Ali El Attar et al., "A Gaussian mixture model for dynamic detection of abnormal behavior in smartphone applications", 2014 [retrieved Feb. 20, 2026], Global Information Infrastructure and Networking Symposium, pp. 1-6, downloaded from <url>:https://ieeexplore. ieee.org/abstract/document/6934278. (Year: 2020).*

Boyuan Chen et al., "A Survey of Software Log Instrumentation", 2021 [retrieved Feb. 20, 2026], ACM Computing Surveys, vol. 54, Issue 4, Article No. 90, pp. 1-34, downloaded from <url>:https:// dl.acm.org/doi/abs/10.1145/3448976. (Year: 2021).*

Anonymous, "Improve Your .NET Code Quality with NDepend", https://www.ndepend.com/, archived on May 9, 2023,8 pages.

Anonymous, "Raygun—Application Monitoring for Web & Mobile Apps", https://raygun.com/, archived on May 9, 2023,8 pages.

* cited by examiner

100

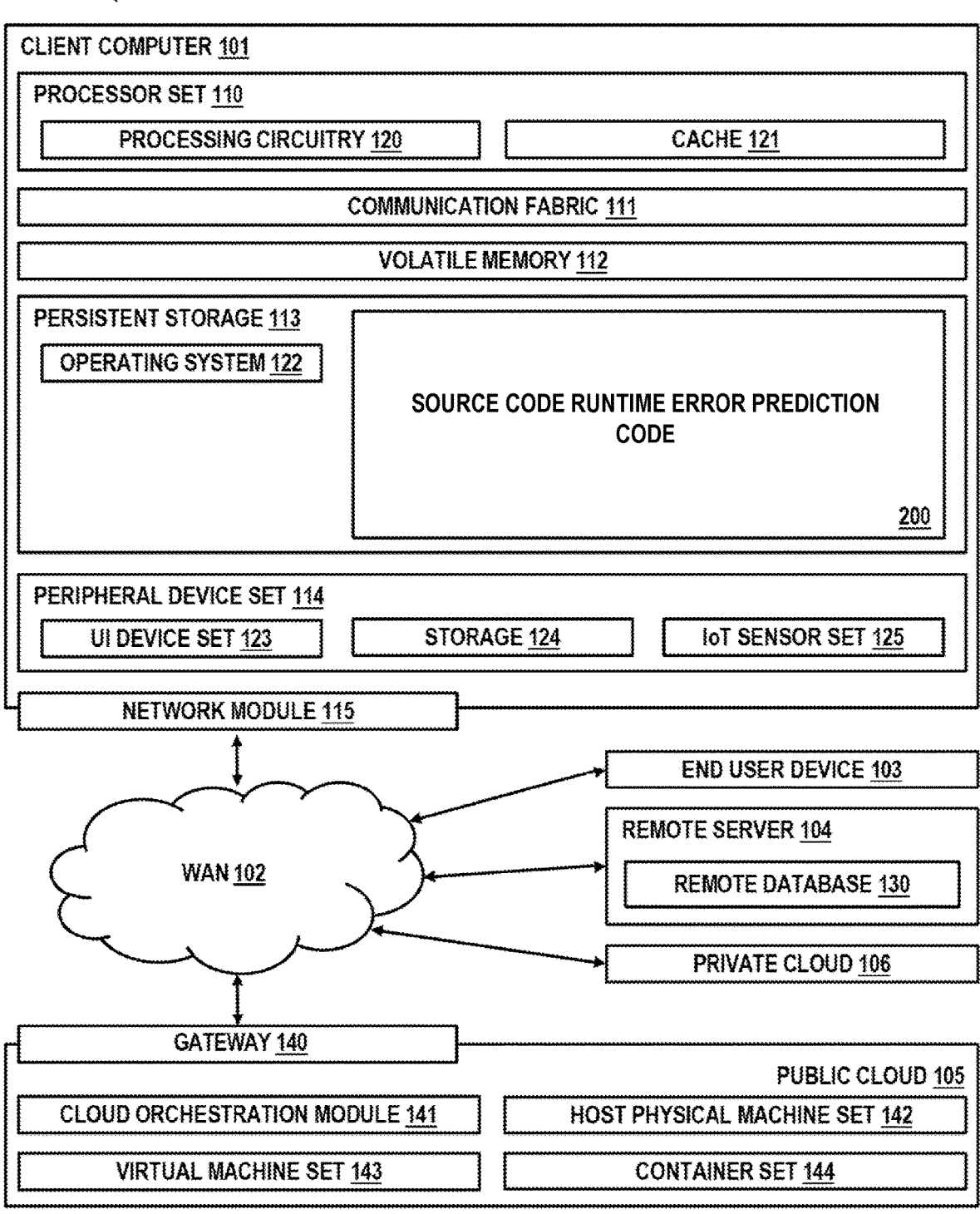

CLIENT COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

SOURCE CODE RUNTIME ERROR PREDICTION CODE

200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

Start

Cluster Similar Regions of the Source Code — 802

Correlate Code Region Clusters with Feature Clusters — 804

Identify Code Region Clusters Involved in Prior Source Code Exceptions — 806

Identify Features of the Prior Exceptions in the Code Region Clusters — 808

Calculate Feature Weights of the Model — 810

Store the Model in Persistent Storage — 812

End

CODE CONCIERGE MODEL (CCM) FOR PREDICTING RUNTIME ERRORS OF SOURCE CODE

BACKGROUND

Aspects of the present invention relate generally to a software development environment and, more particularly, to systems, computer program products, and methods of predicting runtime errors in a software development environment.

Software development environments rely on runtime logs to report runtime information of executing code, including runtime errors that terminate execution of the code. Software developers include a variety of statements in writing software code such as information statements, warning statements, and error statements. In general, best practices for software development include developers writing exception handling routines for catching runtime errors and these exception handling routines are populated with statements that write exception information to runtime logs. These logs are important sources of runtime error information that developers rely upon to understand source code bugs that result in runtime errors and termination of executing code.

SUMMARY

In a first aspect of the invention, there is a computer-implemented method including: clustering, by a processor set, similar regions of source code into clusters of code regions; identifying, by the processor set, source code exceptions from at least one past execution of an executable image of the source code; deriving, by the processor set, a model of features of the source code associated with the source code exceptions for the clusters of code regions; generating, by the processor set, a matrix as output of the model that predicts a likelihood of an occurrence of at least one uncaught exception during a future execution of the executable image of the source code in a cluster of the clusters of code regions; and annotating, by the processor set, the source code in the code region of the cluster with an indication of the likelihood of the occurrence of the at least one uncaught exception.

In another aspect of the invention, there is a computer program product including one or more computer readable storage media having program instructions collectively stored on the one or more computer readable storage media. The program instructions are executable to: cluster similar regions of source code into clusters of code regions; identify source code exceptions from at least one past execution of an executable image of the source code; derive a model of features of the source code associated with the source code exceptions for the clusters of code regions; generate a matrix as output of the model that predicts a likelihood of an occurrence of at least one uncaught exception during a future execution of the executable image of the source code in a cluster of the clusters of code regions; and annotate at least one log event of the source code in the code region of the cluster with an indication of the likelihood of the occurrence of the at least one uncaught exception.

In another aspect of the invention, there is a system including a processor set, one or more computer readable storage media, and program instructions collectively stored on the one or more computer readable storage media. The program instructions are executable to: cluster similar regions of source code into clusters of code regions; determine code regions with at least one source code exception from at least one past execution of an executable image of the source code; model a probability distribution of features of the source code associated with the at least one source code exception for the clusters of code regions; and output a matrix from the model that predicts a likelihood of an occurrence of at least one uncaught exception during a future execution of the executable image of the source code in a cluster of the clusters of code regions.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

DETAILED DESCRIPTION

Figure 2:
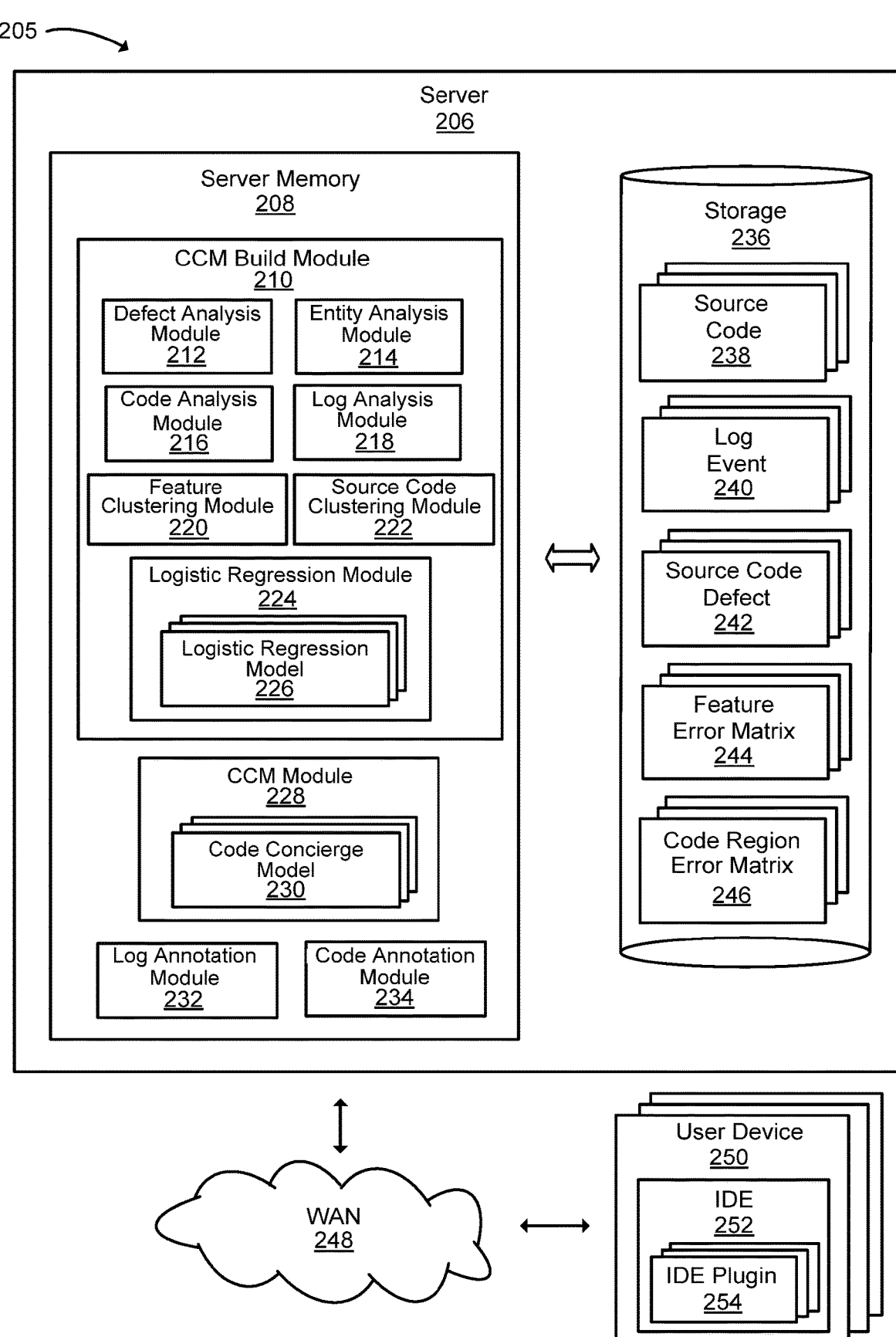
FIG. 2 shows a block diagram of an exemplary environment in accordance with aspects of the present invention.

Aspects of the present invention relate generally to software development environments and, more particularly, to systems, computer program products, and methods of predicting runtime errors in software development environments. More specifically, aspects of the present invention relate to methods, computer program products, and systems for clustering similar regions of source code into clusters of code regions, identifying source code exceptions from past executions of an executable image of the source code, deriving a model of features of the source code associated with the source code exceptions for the clusters of code regions, generating a matrix as output of the model that predicts the likelihood of occurrences of source code errors, including uncaught exceptions, during future executions of the executable image of the source code, and annotating the source code and/or system logs with indications of the likelihood of the occurrence of the software errors, including uncaught exceptions. Unanticipated runtime errors frequently occur in software development environments where exception handling routines for catching runtime errors are missing from the software code and the runtime errors result in termination of execution of the code without any log events output by exception handling routines that account for the runtime errors. According to aspects of the present invention, the methods, systems, and computer program products described herein automatically predict runtime errors in software development environments and indicate the likelihood of those runtime errors occurring in the software source code in integrated development environments (IDE) and/or system logs.

In embodiments, the methods, systems, and computer program products described herein derive features of the source code in embodiments by performing entity analysis that analyzes the source code using logistic regression and vectorization techniques to derive the features of the source code. The methods, systems, and computer program products of the present disclosure cluster features of source code and cluster similar regions of source code following a Gaussian Mixture Model in embodiments. The methods, systems, and computer program products of the present disclosure model features of the source code associated with the source code exceptions for the clusters of similar regions of source code and calculate feature weights of the model using the features of the source code associated with the source code exceptions in the clusters of similar regions of source code as part of a logistic regression model in embodiments. As output of the model, the methods, systems, and computer program products of embodiments of the present invention generate a matrix that predicts the likelihood of occurrences of source code errors, including uncaught exception, during a future execution of the executable image of the source code and annotate the software source code in integrated development environments (IDE) and/or system logs to indicate the likelihood of occurrences of those source code errors.

Aspects of the present invention are directed to improvements in computer-related technology and existing technological processes in software development environments for detecting source code errors, among other features as described herein. In embodiments, the methods, computer program products, and systems may cluster similar regions of source code into clusters of code regions, identify source code exceptions from past executions of an executable image of the source code, derive a model of features of the source code associated with the source code exceptions for the clusters of code regions, generate a matrix as output of the model that predicts the likelihood of occurrences of source code errors, including uncaught exceptions, during future executions of the executable image of the source code, and annotate the source code and/or system logs with indications of the likelihood of the occurrence of the software errors, including uncaught exceptions. Advantageously, the methods, computer program products, and systems described herein automatically detect source code errors and predict uncaught exceptions during future executions of the executable image of the source code in software development environments. These are specific improvements in existing technological processes in software development environments for detecting source code errors, including uncaught exceptions.

Implementations of the disclosure describe additional elements that are specific improvements in the way computers may operate and these additional elements provide non-abstract improvements to computer functionality and capabilities. As an example, the methods, computer program products, and systems describe CCM build module, defect analysis module, entity analysis module, code analysis module, log analysis module, feature clustering module, source code clustering module, logistic regression module, CCM module, log annotation module, and code annotation module that cluster similar regions of source code into clusters of code regions, identify source code exceptions from past executions of an executable image of the source code, derive a model of features of the source code associated with the source code exceptions for the clusters of code regions, generate a matrix as output of the model that predicts the likelihood of occurrences of source code errors, including uncaught exceptions, during future executions of the executable image of the source code, and annotate the source code and/or system logs with indications of the likelihood of the occurrence of the software errors, including uncaught exceptions. The additional elements of the methods, computer program products, and systems of the present disclosure are specific improvements in the way computers may operate to automatically predict runtime errors in software development environments and indicate the likelihood of those runtime errors occurring in the software source code in integrated development environments (IDE) and/or system logs.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as source code runtime error prediction code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the present invention. In embodiments, the environment includes a server 206, which may be a computer system such as a computer 101 described with respect to FIG. 1 with which remote servers 104 and public cloud 105, each also described with respect to FIG. 1, may communicate over a network such as WAN 102 described with respect to FIG. 1. In general, server 206 supports services for generating a model that predicts runtime errors in source code and annotates the source code and/or log events in a software development environment using the model.

Server 206 has a server memory 208 such as volatile memory 112 described with respect to FIG. 1. Server 206 includes, in memory 208, CCM build module 210 having functionality to receive source code, perform static code analysis of the source code, perform entity analysis of the source code, receive and analyze log event data, perform defect analysis of the source code, derive a model that predicts source code runtime errors such as code concierge model 230, and save the model that predicts source code runtime errors in persistent storage, among other functionality in embodiments. The CCM build module 210 may include in embodiments defect analysis module 212 having functionality to analyze defect reports from bug tracking tools, extract defect information from the defect reports, and store the defect information in persistent storage. The CCM build module 210 may also include in embodiments an entity analysis module 214 having functionality to analyze the source code using logistic regression and vectorization techniques to derive code features. The CCM build module 210 may further include in embodiments a code analysis module 216 having functionality to perform static code analysis to identify defects in the software code. The CCM build module 210 may additionally include in embodiments a log analysis module 218 having functionality to scan log events from compilation and/or execution of the source code in system logs, extract log events of warnings and errors from the system logs and store the log events of warnings and errors in persistent storage. Such log events may include, for example, compilation warnings and errors and runtime warnings and errors.

The CCM build module 210 may additionally include in embodiments feature clustering module 220, source code clustering module 222, and logistic regression module 224. The feature clustering module 220 has functionality to receive source code features and create feature clusters of the source code features. In embodiments, a Gaussian Mixture Model (GMM) that approximates a probability distribution of source code features may be created for clustering source code features. The feature clusters can be driven in embodiments by different feature criteria. For example, the feature clusters may be driven by the source code feature's functional proximity, operational proximity, and/or purpose affinity, to name a few. The source code clustering module 222 has functionality to receive source code and cluster code regions of similar source code following a Gaussian Mixture Model (GMM) into code region clusters. The logistic regression module 224 has functionality to receive the feature clusters or the code region clusters and code features identified with defects and/or runtime warnings and errors and functionality to generate logistic regression model 226 with feature weights of features within the feature clusters or the code region clusters of the model calculated using the code features identified with defects and/or runtime warnings and errors.

The CCM build module 210 may derive code concierge model 230 that predicts source code errors, including uncaught exceptions, using the logistic regression model 226. The CCM build module 210 may cluster similar source code regions in embodiments using a clustering technique, such as GMM for example, to identify source code regions, check defect repositories to determine whether a code region was involved in a prior defect, use entity analysis to determine what specific code feature was at the root cause of a thrown exception, and use these features as part of a logistic regression model to calculate feature weights of features within the source code clusters of the model.

The CCM build module 210 may save the code concierge model 230 in persistent storage and may further save code region error matrix 246, output by the code concierge model 230, as a collection class in persistent storage. The model is trained to identify code patterns/regions that are likely to relate to uncaught exceptions.

Continuing with the modules of server 206, server 206 further includes, in memory 208, CCM module 228 having functionality to predict source code errors, including uncaught exceptions, using feature error matrix 244 output by code concierge model 230. CCM module 228 may include code concierge model 230 built by CCM build module 210. The code concierge model 230 provides feature error matrix 244 of probability values used to predict source code errors, including uncaught exceptions, and can adjust criteria for clustering features.

Server 206 may also include, in memory 208, log annotation module 232 having functionality to annotate system logs with predicted errors of features, functions and other references to the source code in embodiments using code region error matrix 246 output by code concierge model 230. Server 206 may additionally include, in memory 208, code annotation module 234 having functionality to annotate source code with predicted errors of features, functions and other references to the source code in embodiments using code region error matrix 246 output by code concierge model 230. In embodiments, code region error matrix 246 may be output as a collection class from the code concierge model 230. The collection class can be added as an integrated development environment (IDE) plugin to the IDE on a user device that can infer probabilistically what code regions will throw an exception in the source code.

In embodiments, the CCM build module 210, defect analysis module 212, entity analysis module 214, code analysis module 216, log analysis module 218, feature clustering module 220, source code clustering module 222, logistic regression module 224, CCM module 228, log annotation module 232, and code annotation module 234 may each comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The server 206 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the present invention, server 206 of FIG. 2 also includes storage 236 which may be storage such as storage 124 of computer 101 described with respect to FIG. 1. Storage 236 may store in files source code 238 which may be any programming language source code including Java, JavaScript, Python, Node JS, Golang, or other programming languages. Storage 236 may also store in files log events 240 extracted from system logs for source code by log analysis module 218. For example, the log events may include compilation warnings and errors, run-time warnings and errors, and other notifications and/or warnings relating to the executable image of the source code. Storage 236 may additionally store in files source code defects 242 extracted from defect reports provided by bug tracking tools. For instance, the source code defects may include functional bugs, logical bugs, security bugs, and other defects identified by manual inspection of the source code and/or source code analysis tools.

Storage 236 may additionally store feature error matrix 244 in files and code region error matrix 246 in files. Feature error matrix 244 provides a probability value between 0 and 1 for each source code feature in each feature cluster that indicates the likelihood the feature is a cause of a runtime error in the feature cluster. Code region error matrix 246 provides probability values used to predict source code errors, including uncaught exceptions, in source code regions. In embodiments, code region error matrix 246 provides a probability value between 0 and 1 for each source code feature in each source code region that indicates the likelihood the feature is a cause of a runtime error in the source code region. Accordingly, code region error matrix 246 can predict the probability of a source code error, including an uncaught exception, for a specific code feature in a source code region.

In accordance with aspects of the present invention, environment 205 of FIG. 2 also shows user device 250 which may be a computer system such as end user device 103, described with respect to FIG. 1, that may communicate over WAN 248 which may be a wide area network such as WAN 102, described with respect to FIG. 1. User device 250 may include integrated development environment (IDE) 252 that provides a software development environment for a software developer to create source code. The IDE 252 may generate source code such as source code 238 which may be any programming language source code including Java, JavaScript, Python, Node JS, Golang, or other programming languages. In embodiments, IDE 252 includes IDE plugin 254 including a collection class from the code concierge model 230 that can infer probabilistically what code regions will throw an exception in the source code.

Figure 3:
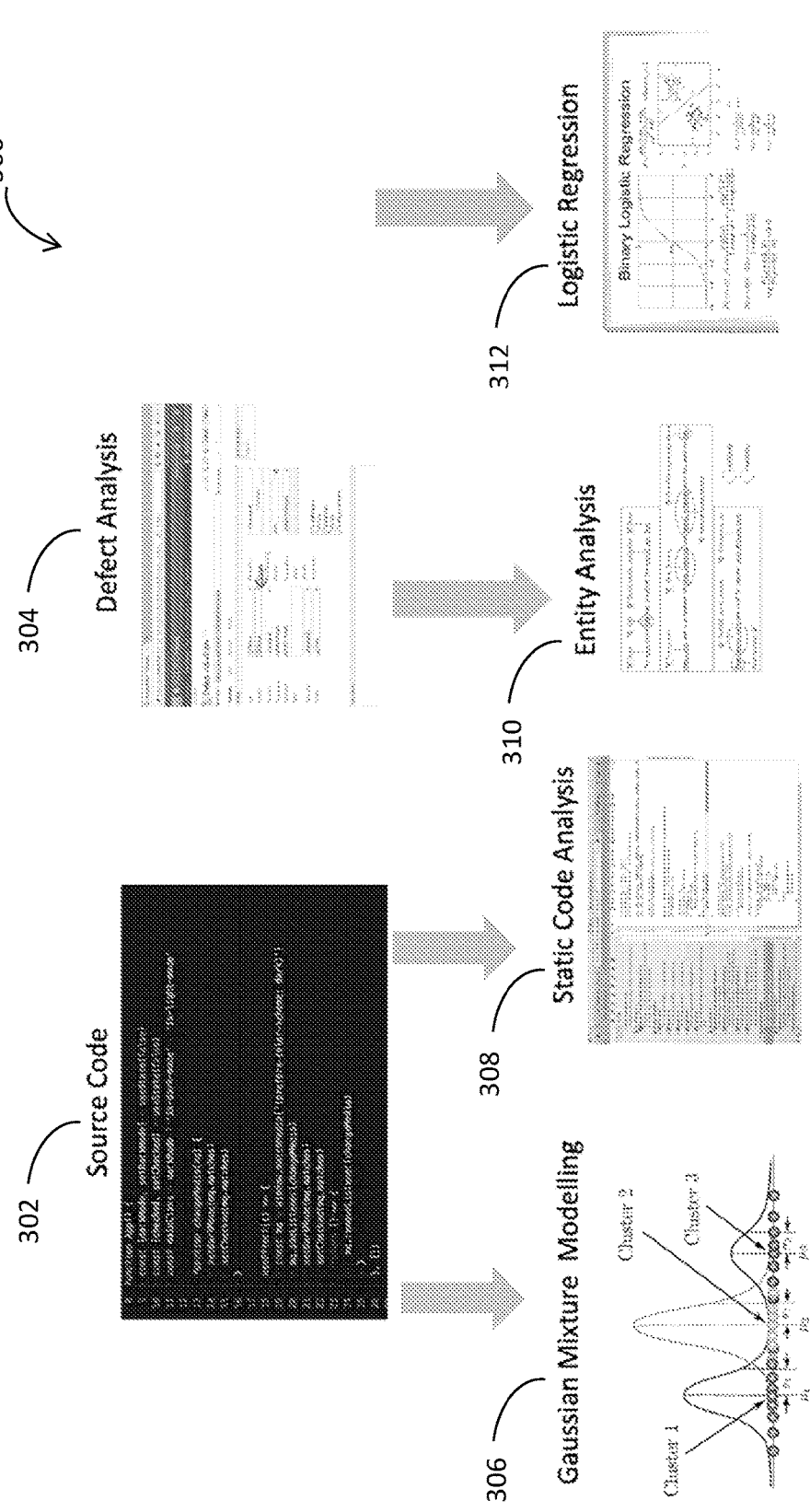
FIG. 3 depicts an illustration of an exemplary diagram of analysis and data modeling of source code errors in accordance with aspects of the present invention.

FIG. 3 depicts an illustration of an exemplary diagram of analysis and data modeling of source code errors in accordance with aspects of the present invention. In general, diagram 300 of FIG. 3 illustrates that source code 302 and defect analysis 304 of source code 302 is analyzed and modeled by Gaussian Mixture Modeling 306, static code analysis 308, entity analysis 310 and logical regression 312. In particular, entity analysis 310 of the source code 302 and defect analysis 304 is performed using logistic regression 312 with vectorization techniques to derive features of the source code 302. For instance, defect analysis module 212, described with respect to FIG. 2, analyzes defect reports from bug tracking tools to extract defect information from the defect reports and store the defect information in source code defect file 242. The defect information from defect reports may include feature information extracted by entity analysis 310. In embodiments, code analysis module 216, described with respect to FIG. 2, performs static code analysis that additionally identifies defects in the source code 238, described with respect to FIG. 2, that may include feature information that is extracted by entity analysis 310. Entity analysis module 214, described with respect to FIG.

2, may perform entity analysis of the source code and additionally defect information in embodiments using logistic regression and vectorization techniques to derive source code features.

The derived features of the source code 302 are clustered following a GMM in embodiments, for instance, by feature clustering module 220 described with respect to FIG. 2. In embodiments, the feature clusters following a GMM can be driven by different feature criteria. For example, the feature clusters may be driven by the feature's functional proximity, operational proximity, and/or purpose affinity. In addition to analyzing and modeling source code 302, defects from past executions of an executable image of the source code can be identified to provide a reference baseline from past executions. For example, defect information provided in source code defect file 242, described with respect to FIG. 2, can be used to provide a reference baseline from past executions. Furthermore, log analysis module 218, described with respect to FIG. 2, can conduct an analysis on previous log events in log event file 240, described with respect to FIG. 2, to identify defects in order to provide a reference baseline from past executions.

Figure 4:
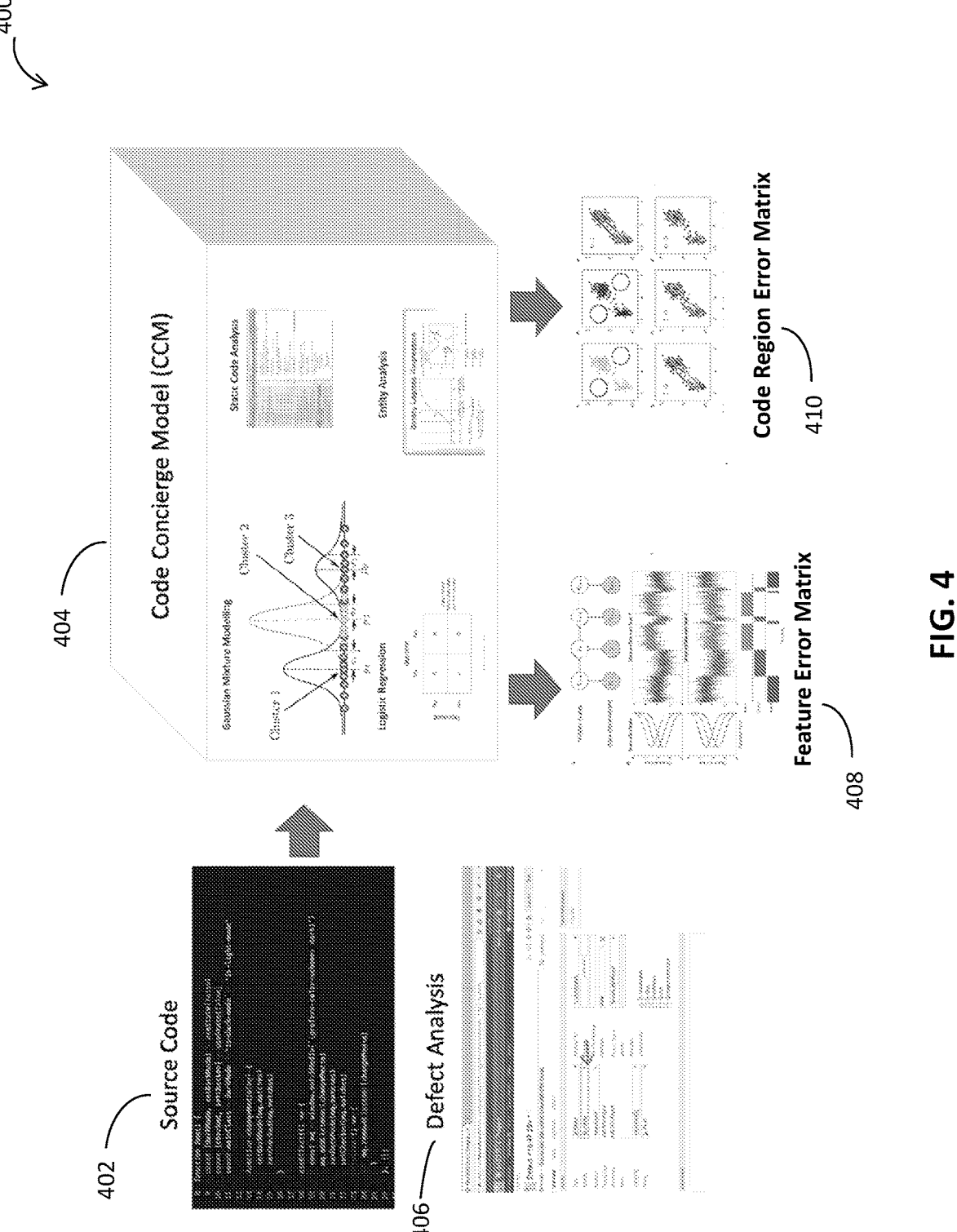
FIG. 4 depicts an illustration of an exemplary diagram of output from a data model of source code errors in accordance with aspects of the present invention.

FIG. 4 depicts an illustration of an exemplary diagram of output from a data model of source code errors in accordance with aspects of the present invention. More specifically, diagram 400 of FIG. 4 illustrates processing source code 402 and defect analysis 406 in embodiments to derive a code concierge model (CCM) 404 that outputs a feature error matrix 408 and a code region error matrix 410. To derive CCM 404, similar source code is clustered in embodiments using a clustering technique, such as GMM for example, to identify similar source code regions, and source code regions involved in a prior defect are identified. For instance, CCM build module 210, described with respect to FIG. 2, clusters similar source code regions in embodiments and checks defect repositories such as log events file 240 and source code defect file 242, each described with respect to FIG. 2, to determine whether a code region was involved in a prior defect such as a thrown exception at runtime. Entity analysis is used to determine what specific code feature was at the root cause of thrown exception. In embodiments, logistic regression module 224, described with respect to FIG. 2, receives the code region clusters and source code features identified with defects in the code region clusters and generates a logistic regression model 226, described with respect to FIG. 2, with feature weights of features within the code region clusters of the model calculated using the code features identified with defects. For instance, features within each code region cluster of the CCM that are identified with a defect are given a feature weight between 0 and 1, and features not identified with a defect are given a weight of zero. The CCM is trained using the source code and defect analysis to identify code regions that are likely to relate to errors, including uncaught exceptions.

Feature error matrix 408 output by CCM 404 is a probability matrix of values between 0 and 1 that represent the probability a feature of the source code causes a source code error in a feature cluster. Code region error matrix 410 output by CCM 404 is a probability matrix of values between 0 and 1 that represent the probability a feature of the source code causes a source code error in a code region of the source code. By modeling defects in the source code, the probability of code being executed in an anomalous way can be determined for a given feature of the code. In this way, aspects of the present invention may predict source code errors, including runtime errors of uncaught exception.

Figure 5:
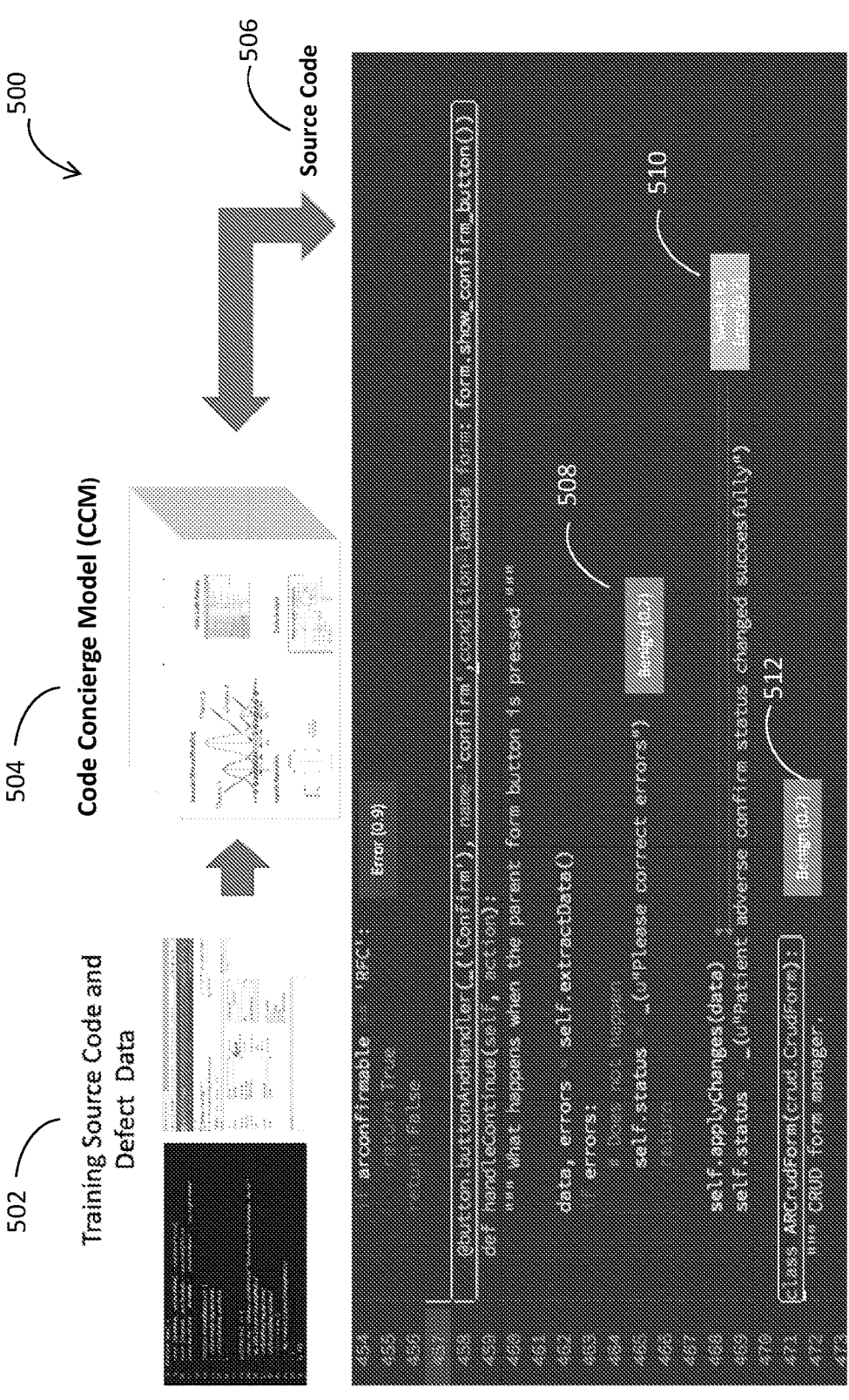
FIG. 5 depicts an illustration of an exemplary diagram of source code annotation in accordance with aspects of the present invention.

FIG. 5 depicts an illustration of an exemplary diagram of source code annotation in accordance with aspects of the present invention. In particular, diagram 500 of FIG. 5 illustrates training source code and defect data 502 used to train CCM 504 that may predict errors in source code 506 that may be presented in an IDE. For instance, the source code can be annotated with visual indicators that certain features/functions might require additional attention. In an embodiment, a collection class from the CCM can be added as an IDE plugin to the IDE that can infer probabilistically what code regions in the source code will throw an exception based on input of a given feature of the code. The source code can be annotated with information indicating the likelihood of an error for certain features and/or functions of the source code. For example, source code 506 depicted in FIG. 5 illustrates visual indicators at reference numerals 508, 510 and 512 that respectively indicates a benign error for a certain line of code with a 0.7 percent likelihood of generating a runtime error, a switch to error for another line of code with a 0.7 percent likelihood of generating a runtime error, and a benign error for one more line of code with a 0.7 percent likelihood of generating a runtime error.

Figure 6:
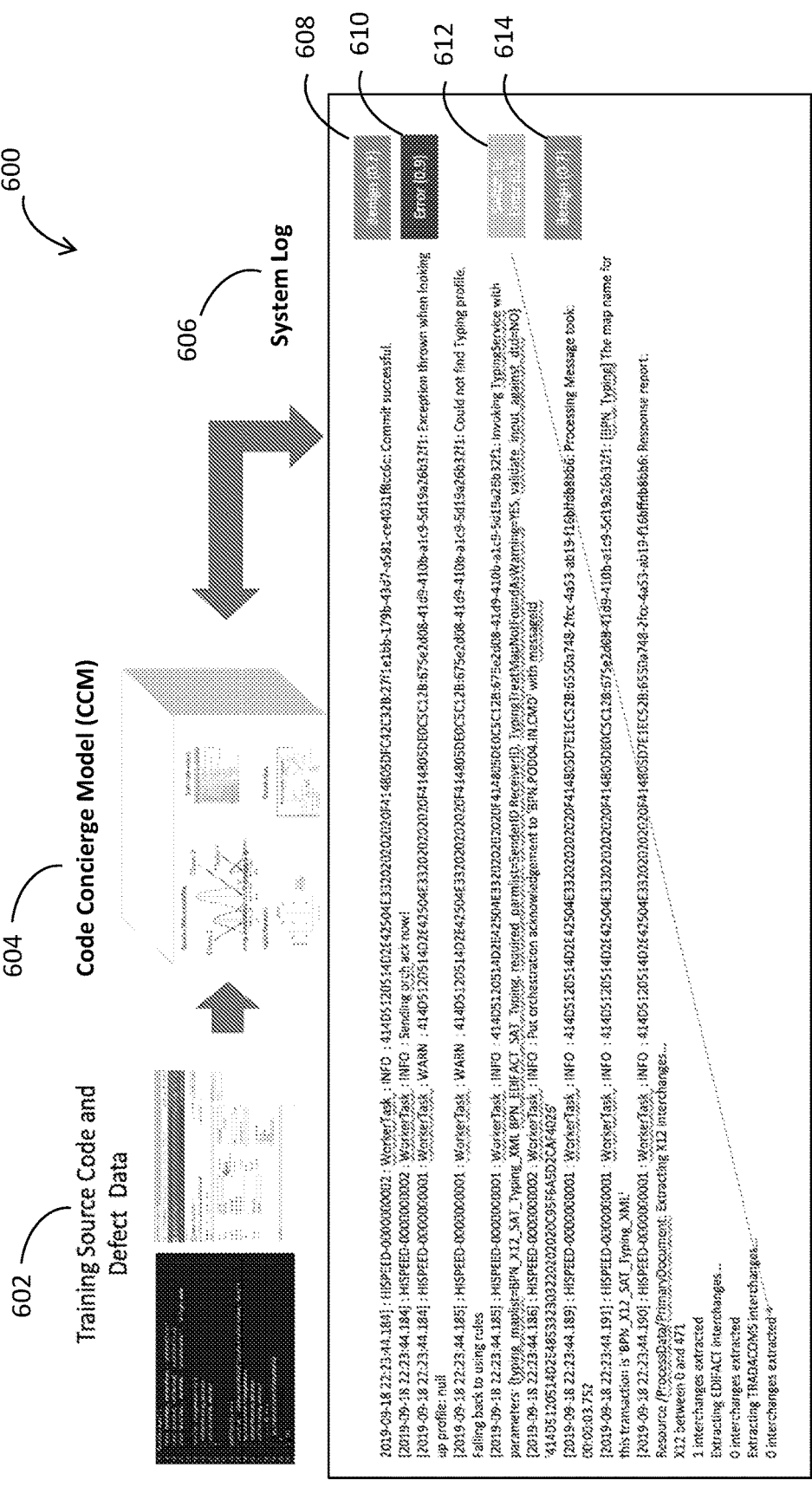
FIG. 6 depicts an illustration of an exemplary diagram of log event annotation in accordance with aspects of the present invention.

FIG. 6 depicts an illustration of an exemplary diagram of log event annotation in accordance with aspects of the present invention. More specifically, diagram 600 of FIG. 6 illustrates training source code and defect data 602 used to train CCM 604 that may predict errors in source code which may be entered into a system log 606 by annotating log events. For instance, System.out messages such as information (INFO), warning (WARN) and error (ERROR) messages for source code output into a system log can be annotated with visual indicators that certain features/functions might require additional attention. In embodiments, a collection class from the CCM can be added as an IDE plugin to the IDE that can infer probabilistically what code regions in the source code will throw an exception based on input of a given feature of the code. System.out messages output into the system log can be annotated with information indicating the likelihood of an error for certain features and/or functions of the source code and other references to the source code. For example, the system log 606 depicted in FIG. 6 illustrates visual indicators at reference numerals 608, 610, 612 and 614 that respectively indicates a benign error for a certain line of code with a 0.7 percent likelihood of generating a runtime error, an error for another line of code with a 0.9 percent likelihood of generating a runtime error, a switch to error for yet another line of code with a 0.7 percent likelihood of generating a runtime error, and a benign error for one more line of code with a 0.7 percent likelihood of generating a runtime error. In addition, the system can also automatically generate System.out messages output into the system log in embodiments such as an ERROR message, for instance, indicating a line of code has a likelihood of throwing an uncaught exception. Such unhandled exceptions can be added in embodiments to the CCM for successive training of the model. Furthermore, the information of predicted errors in source code output by System.out messages can be reported within log aggregation tools.

Figure 7:
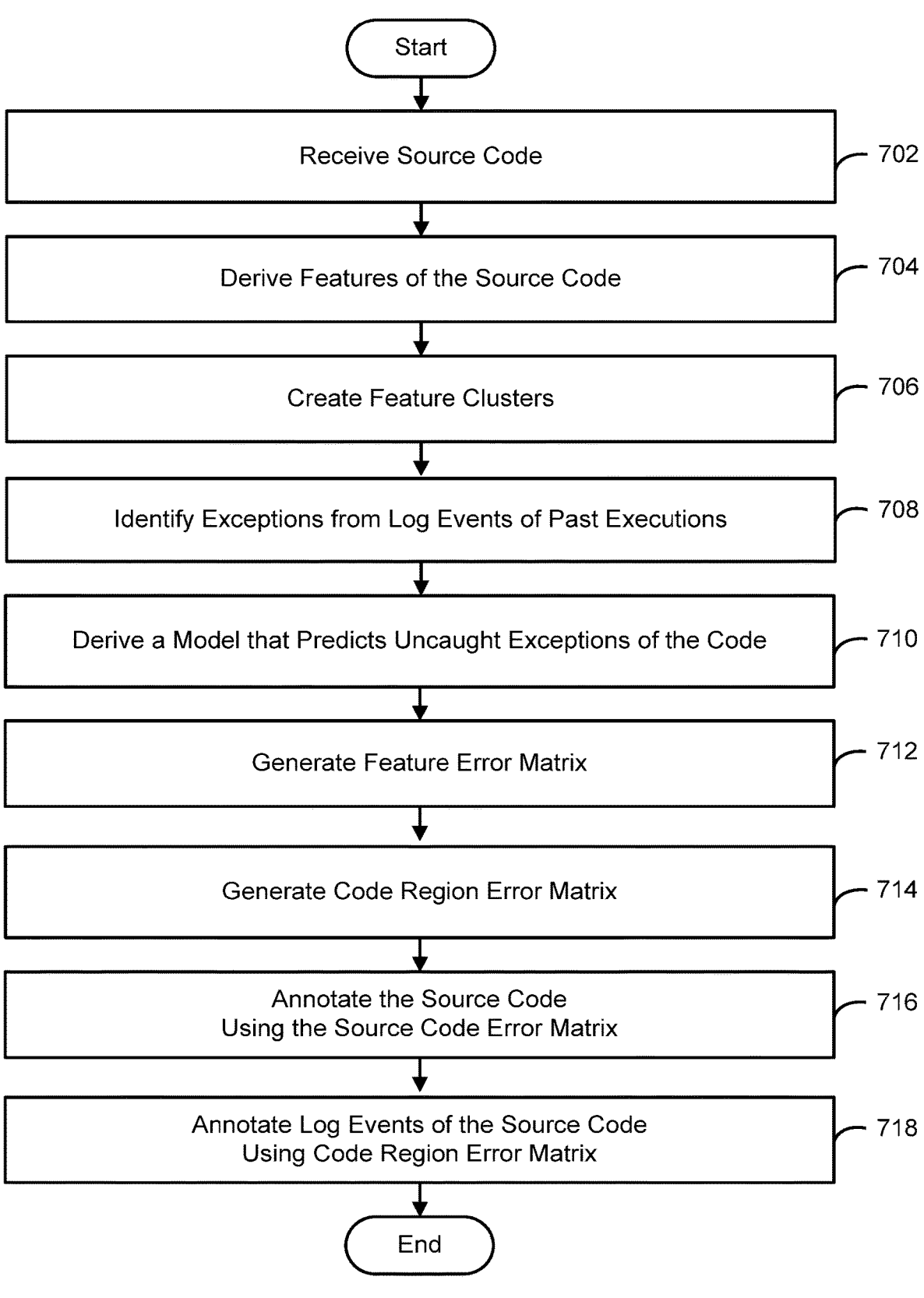
FIG. 7 shows a flowchart of an exemplary method in accordance with aspects of the present invention.
Figure 8:
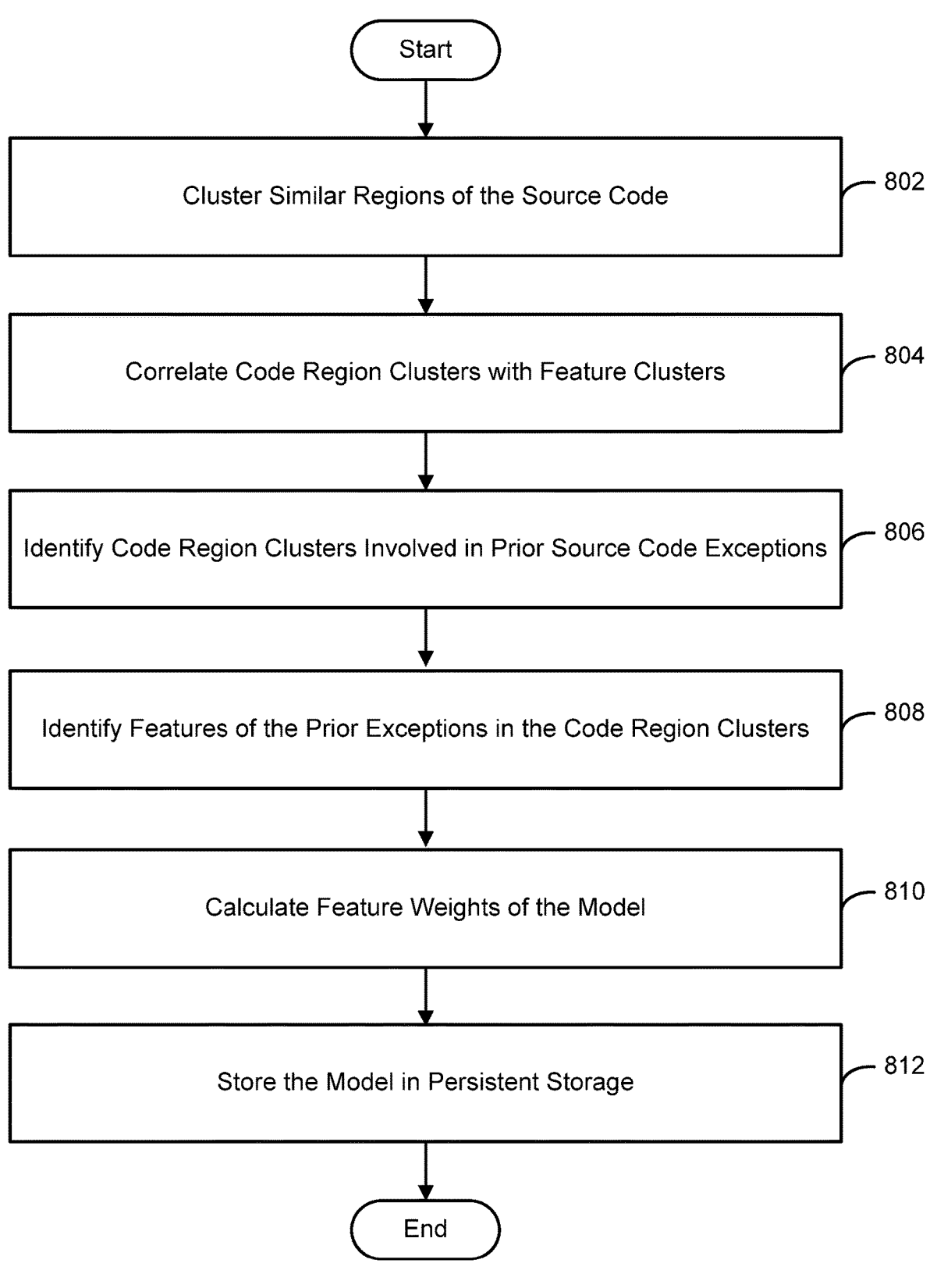
FIG. 8 shows a flowchart of an exemplary method in accordance with aspects of the present invention.

FIGS. 7-8 show flowcharts and/or block diagrams that illustrate the architecture, functionality, and operation of possible implementations of systems, methods, and computer program products according to various embodiments of the present invention. As noted above with respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time. And some blocks shown may be performed and other blocks not performed, depending upon the functionality involved.

FIG. 7 shows a flowchart of an exemplary method in accordance with aspects of the present invention. Steps of the method may be carried out in the environment of FIG. 2 and are described with reference to elements depicted in FIG. 2. In particular, the flowchart of FIG. 7 shows an exemplary method for annotating source code and annotating log events of the source code using a model that predicts errors in the source code in accordance with aspects of the present invention.

At step 702, the system receives source code. In embodiments, the source code may be any programming language source code including Java, JavaScript, Python, Node JS, Golang, or other programming languages. For instance, the source generated by a developer in the IDE on a user device may be sent in embodiments to the CCM build module 210. In other embodiments, the CCM build module may be provided as an IDE plugin in the IDE on the user device. In embodiments, and as described with respect to FIG. 2, CCM build module 210 receives the source code.

At step 704, the system derives features of the source code. For example, the system can receive and perform entity analysis in embodiments to analyze the source code using logistic regression and vectorization techniques to derive source code features. In embodiments, defect information from defect reports may include feature information, and defects identified by static code analysis may also include feature information. Entity analysis may additionally be performed in embodiments to analyze the feature information extracted from defect reports and defects identified by static code analysis. In embodiments, and as described with respect to FIG. 2, entity analysis module 214 derives features of the source code.

At step 706, the system creates feature clusters. In embodiments, the derived features of the source code are clustered using a Gaussian Mixture Model (GMM) that approximates a probability distribution of source code features. The feature clusters following a GMM can be driven in embodiments by different feature criteria. For example, the feature clusters may be driven by the source code feature's functional proximity, operational proximity, and/or purpose affinity, to name a few. In embodiments, and as described with respect to FIG. 2, feature clustering module 220 creates the feature clusters.

At step 708, the system identifies exceptions from log events of past executions. For example, the system can scan log events from compilation and/or execution of the source code in system logs, extract log events of warnings and errors from the system logs and store the log events of warnings and errors in persistent storage. Such log events may include, for example, compilation warnings and errors and runtime warnings and errors. These identified defects of an executable image of the source code provide a reference baseline of past executions. In embodiments, and as described with respect to FIG. 2, log analysis module 218 identifies exceptions from log events of past executions.

At step 710, the system derives a model that predicts uncaught exceptions of the source code. For instance, the system may derive the model that predicts source code errors, including uncaught exceptions, in embodiments by clustering similar source code to identify source code regions, checking defect repositories to determine whether a code region was involved in a prior defect, using entity analysis to determine what specific code feature was at the root cause of a thrown exception, and using these features as part of a logistic regression model to calculate feature weights of features within the source code clusters of the model. In embodiments, and as described with respect to FIG. 2, CCM build module 210 derives the model that predicts uncaught exceptions of the source code, namely code concierge model 230. FIG. 8 below describes in further detail the method in embodiments for deriving the model that predicts uncaught exceptions of the source code.

At step 712, the system generates a feature error matrix. For example, the system provides a feature error matrix, such as feature error matrix 244 described with respect to FIG. 2, of probability values used to predict source code errors, including uncaught exceptions, in feature clusters. In embodiments, the feature error matrix 244 provides a probability value between 0 and 1 for each source code feature in each feature cluster that indicates the likelihood the feature is a cause of a runtime error in the feature cluster. In embodiments, and as described with respect to FIG. 2, the code concierge model 230 generates the feature error matrix of probability values used to predict source code errors, including uncaught exceptions, in feature clusters.

At step 714, the system generates a code region error matrix. For example, the system provides a code region error matrix, such as code region error matrix 246 described with respect to FIG. 2, of probability values used to predict source code errors, including uncaught exceptions, in source code regions. In embodiments, the code region error matrix 246 provides a probability value between 0 and 1 for each source code feature in each source code region that indicates the likelihood a given feature is a cause of a runtime error in the source code region. In embodiments, and as described with respect to FIG. 2, the code concierge model 230 generates the code region error matrix of probability values used to predict source code errors, including uncaught exceptions, in source code regions.

At step 716, the system annotates the source code using the code region error matrix. For example, the system uses the probability values in the code region error matrix that indicate the likelihood a given feature is a cause of a runtime error in the source code region to annotate the source code. In an embodiment, a collection class generated by code concierge model 230, described with respect to FIG. 2, can be added as an IDE plugin to the IDE that can infer probabilistically what code regions in the source code will throw an exception based on input of a given feature of the code. Code annotation module 234, described with respect to FIG. 2, can also be added as an IDE plugin to the IDE that can annotate the source code using the code region error matrix. Thus, the system can predict and indicate in an IDE the likelihood of source code errors of certain features and functions that might require additional attention by a developer. In embodiments, and as described with respect to FIG. 2, code annotation module 234 annotates the source code using the code region error matrix.

At step 718, the system annotates log events of the source code using the code region error matrix. For example, the system uses the probability values in the code region error matrix that indicate the likelihood a given feature is a cause of a runtime error in the source code region to annotate log events of the source code. In an embodiment, a collection class generated by code concierge model 230, described with respect to FIG. 2, can be added as an IDE plugin to the IDE that can infer probabilistically what code regions in the source code will throw an exception based on input of a given feature of the code. Log annotation module 232, described with respect to FIG. 2, can also be added as an IDE plugin to the IDE that can annotate log events of the source code using the code region error matrix. In addition, log annotation module 232 can also automatically generate messages as log events output into the system log in embodiments such as an ERROR message, for instance, indicating a line of code has a likelihood of throwing an uncaught exception. Thus, the system can predict and indicate in system logs the likelihood of source code errors of certain features and functions that might require additional attention by a developer. In embodiments, and as described with respect to FIG. 2, log annotation module 232 annotates log events of the source code using the code region error matrix.

FIG. 8 shows a flowchart of an exemplary method in accordance with aspects of the present invention. Steps of the method may be carried out in the environment of FIG. 2 and are described with reference to elements depicted in FIG. 2. In particular, the flowchart of FIG. 8 shows an exemplary method for deriving a model that predicts uncaught exceptions of source code, in accordance with aspects of the present invention.

At step 802, the system clusters similar regions of the source code. For example, the system may cluster similar source code in embodiments using a clustering technique, such as GMM for example, to identify source code regions with similar code patterns. In embodiments, and as described with respect to FIG. 2, the source code clustering module 222 clusters similar regions of the source code.

At step 804, the system correlates code region clusters with feature clusters. For example, the system can assess in embodiments that there is sufficient correspondence between the code region clusters and the feature clusters if a correlation measure does not exceed a certain threshold. If the correlation measure exceeds the certain threshold, the clustering criteria are adjusted and the source code is clustered iteratively until the correlation measure does not exceed the certain threshold. In embodiments, and as described with respect to FIG. 2, the source code clustering module 222 correlates code region clusters with feature clusters.

At step 806, the system identifies code region clusters involved in prior source code exceptions. For example, the system checks defect repositories such as log events file 240 and source code defect file 242, each described with respect to FIG. 2, to determine whether a code region was involved in a prior defect such as a thrown exception at runtime. In embodiments, and as described with respect to FIG. 2, CCM build module 210 identifies code region clusters involved in prior source code exceptions.

At step 808, the system identifies features of the prior exceptions in the code region clusters. For instance, the system performs entity analysis to analyze the code region clusters and the description of the prior exceptions using logistic regression and vectorization techniques to determine what specific code feature was at the root cause of a thrown exception. In embodiments, and as described with respect to FIG. 2, CCM build module 210 with entity analysis module 214 identifies features of the prior exceptions in the code region clusters.

At step 810, the system calculates feature weights of the model. For example, the system uses features identified with defects in the code region clusters as part of a logistic regression model to calculate feature weights of features within the code region clusters of the model. In embodiments, logistic regression module 224, described with respect to FIG. 2, receives the code region clusters and source code features identified with defects in the code region clusters and generates a logistic regression model 226, described with respect to FIG. 2, with feature weights of features within the code region clusters of the model calculated using the code features identified with defects. For instance, features within each code region cluster of the CCM that are identified with a defect are given a feature weight between 0 and 1, and features not identified with a defect are given a weight of zero. In embodiments, and as described with respect to FIG. 2, CCM build module 210 with logistic regression module 224 calculates feature weights of the code concierge model 230.

At step 812, the system stores the model in persistent storage. For example, the system saves the code concierge model 230 in persistent storage of server 206, each described with respect to FIG. 2.

In this way, embodiments of the present disclosure derive a model that predicts uncaught exceptions of source code. Advantageously, embodiments of the present disclosure annotate the source code with information indicating the likelihood of an error for certain features and/or functions of the source code that might require additional attention by a developer. Furthermore, embodiments of the present disclosure also annotate log events of the source code with information indicating the likelihood of an error for certain features and/or functions of the source code. In addition, embodiments of the present disclosure can further automatically generate messages as log events output into the system log in embodiments indicating a source code feature and/or function has a likelihood of throwing an uncaught exception.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

18

What is claimed is:

1. A method, comprising:
   clustering, by a processor set, regions of source code into clusters of code regions based on a similarity of the regions of source code determined by a Gaussian Mixture Model;
   correlating, by the processor set, the clusters of code regions with feature clusters by iteratively adjusting clustering criteria and assessing a correlation measure between the feature clusters and the clusters of code regions against a predetermined threshold, the feature clusters generated based on proximity to features of the source code;
   identifying, by the processor set, source code exceptions from log events in system logs of at least one past execution of an executable image of the source code;
   deriving, by the processor set, a model of the features of the source code, wherein the features of the source code are associated with the source code exceptions;
   generating, by the processor set, a matrix as output of the model, wherein the output predicts a likelihood of an occurrence of at least one uncaught exception during a future execution of the executable image of the source code in a cluster of the clusters of code regions; and
   annotating, by the processor set, with visual indicators in the system logs, at least one log event of the source code of the cluster with an indication of the likelihood of the occurrence of the at least one uncaught exception.

2. The method of claim 1, further comprising:
   deriving the features of the source code; and
   clustering the features of the source code into the feature clusters.

3. The method of claim 2, wherein the deriving comprises performing entity analysis that analyzes the source code using logistic regression and vectorization techniques to derive the features of the source code.

4. The method of claim 2, wherein the clustering the features comprises using a Gaussian Mixture Model to generate the feature clusters.

5. The method of claim 1, further comprising calculating feature weights of the model using the features of the source code associated with the source code exceptions as part of a logistic regression model.

6. The method of claim 1, further comprising:
   generating a log event indicating the likelihood of the occurrence of the at least one uncaught exception; and
   outputting the log event into a system log.

7. The method of claim 1, wherein the identifying comprises:
   scanning log events from the at least one past execution in a system log; and
   extracting information of warnings and errors from the log events of the system log for the source code.

8. The method of claim 1, wherein the matrix comprises probability values that predict the likelihood of the occurrence of the at least one uncaught exception.

9. A computer program product comprising one or more computer readable storage media having program instructions collectively stored on the one or more computer readable storage media, the program instructions executable to:
   cluster regions of source code into clusters of code regions based on a similarity of the regions of source code determined by a Gaussian Mixture Model;
   correlate the clusters of code regions with feature clusters by iteratively adjusting clustering criteria and assessing a correlation measure between the feature clusters and the clusters of code regions against a predetermined threshold, the feature clusters generated based on proximity to features of the source code;

identify source code exceptions from log events in system logs of at least one past execution of an executable image of the source code;

derive a model of the features of the source code, wherein the features of the source code are associated with the source code exceptions;

generate a matrix as output of the model, wherein the output predicts a likelihood of an occurrence of at least one uncaught exception during a future execution of the executable image of the source code in a cluster of the clusters of code regions; and annotate, at least one log event of the source code of the cluster with an indication of the likelihood of the occurrence of the at least one uncaught exception.

10. The computer program product of claim 9, wherein the program instructions are further executable to:

derive the features of the source code using entity analysis; and cluster the features of the source code using a Gaussian Mixture Model to generate the feature clusters.

11. The computer program product of claim 9, wherein the program instructions are further executable to calculate feature weights of the model using the features of the source code associated with the source code exceptions as part of a logistic regression model.

12. The computer program product of claim 9, wherein the program instructions are further executable to:

generate a log event indicating the likelihood of the occurrence of the at least one uncaught exception; and output the log event into a system log.

13. The computer program product of claim 9, wherein the program instructions are further executable to annotate the source code of the cluster with the indication of the likelihood of the occurrence of the at least one uncaught exception.

14. A system comprising:

a processor, a computer readable memory, one or more computer readable storage media, and program instructions collectively stored on the one or more computer readable storage media, the program instructions executable to:

cluster regions of source code into clusters of code regions based on a similarity of the regions of source code determined by a Gaussian Mixture Model;

correlate the clusters of code regions with feature clusters by iteratively adjusting clustering criteria and assessing a correlation measure between the feature clusters and the clusters of code regions against a predetermined threshold, the feature clusters generated based on proximity to features of the source code;

determine code regions with at least one source code exception from log events in system logs of at least one past execution of an executable image of the source code;

generate a model of a probability distribution of the features of the source code, wherein the features of the source code are associated with the at least one source code exception;

output a matrix from the model, wherein the matrix predicts a likelihood of an occurrence of at least one uncaught exception during a future execution of the executable image of the source code in a cluster of the clusters of code regions; and annotate, with visual indicators in the system logs, at least one log event of the source code of the cluster with an indication of the likelihood of the occurrence of the at least one uncaught exception.

15. The system of claim 14, wherein the program instructions are further executable to:

derive the features of the source code using entity analysis; and cluster the features of the source code using a Gaussian Mixture Model to generate the feature clusters.

16. The system of claim 14, wherein the program instructions are further executable to:

generate a log event indicating the likelihood of the occurrence of the at least one uncaught exception; and output the log event into a system log.

17. The system of claim 14, wherein the program instructions are further executable to annotate, with visual indicators, the source code of the cluster with an indication of the likelihood of an occurrence of an error for one or more of the features of the source code.

* * * * *